United States Patent [19]
Schubert

[11] 3,850,721

[45] Nov. 26, 1974

[54] METHOD OF CLEANING AND TRANSFERRING SEMICONDUCTORS

[75] Inventor: Wolfgang Curt Schubert, Dallas, Tex.

[73] Assignee: Texas Instruments Incorporated, Dallas, Tex.

[22] Filed: Feb. 21, 1973

[21] Appl. No.: 334,341

Related U.S. Application Data

[62] Division of Ser. No. 25,491, April 3, 1970, Pat. No. 3,755,048.

[52] U.S. Cl............ 156/155, 29/423, 29/559, 134/5, 134/26, 134/40, 156/235, 156/236, 156/239

[51] Int. Cl....... B32b 31/00, B08b 3/10, B08b 7/04

[58] Field of Search ........... 156/235, 236, 234, 239, 156/155, 300, 344; 29/583, 559, 423; 134/2, 5, 25 R, 26, 35, 40

[56] References Cited
UNITED STATES PATENTS

| | | | |
|---|---|---|---|
| 2,984,897 | 5/1961 | Godfrey | 156/155 X |
| 3,066,050 | 11/1962 | Garton, Jr. | 134/2 |
| 3,448,510 | 6/1969 | Bippus et al. | 29/583 X |
| 3,562,057 | 2/1971 | McAlister et al. | 156/300 |
| 3,586,559 | 6/1971 | Shepard | 156/155 |
| 3,690,984 | 9/1972 | Wanesky | 156/235 |

Primary Examiner—Charles E. Van Horn
Assistant Examiner—Thomas E. Bokan
Attorney, Agent, or Firm—Harold Levine; James T. Comfort; James O. Dixon

[57] ABSTRACT

In a method of cleaning and transferring semiconductors, a paper chip transfer member is glued to a plurality of beam lead chips while the chips are secured to a sapphire disk by a layer of wax. Then, the wax is melted to release the chips, and the chips are cleaned by immersing the chips and the transfer member in a wax solvent. After the cleaning step, the chips are secured to a polyester chip receiving member by the simultaneous application of heat and pressure. The transfer member is then released from the chips by immersing the transfer member, the chips and the receiving member in a glue solvent. Finally, the chips are cleaned by immersing the chips and the receiving member in another solvent.

8 Claims, 15 Drawing Figures

METHOD OF CLEANING AND TRANSFERRING SEMICONDUCTORS

This is a division, of application Ser. No. 25,491, filed Apr. 3, 1970 now U.S. Pat. No. 3,755,048.

This invention relates to a method of cleaning and transferring semiconductors, and more particularly to a process for accurately and economically cleaning and transferring beam lead chips.

In the semiconductor components manufacturing industry, beam lead chips are fabricated in the form of relatively large slices or wafers, each including a plurality of individual chips. When the fabrication of the unseparated chips comprising such a slice has been completed, the slice is secured to a sapphire disk by a layer of wax positioned between the slice and the disk. Then, the slice is separated into individual beam lead chips by separation etching.

Before the individual chips can be used for subsequent product assembly, it is necessary to release the chips from the sapphire disk and to clean the wax from the chips. Typically, this is accomplished during the transfer of the chips from the sapphire disk to a chip receiving member. For example, in accordance with one prior art cleaning and transferring process, beam lead chips are secured to a wire screen for removal from the sapphire disk and for cleaning. After the cleaning operation, the chips are pressed into engagement with a layer of adhesive formed on a glass plate. Finally, the wire screen is removed from the chips.

Beam lead chip cleaning and transferring processes of the type employing wire screen chip transfer members and adhesive coated chip receiving members have several inherent disadvantages. First, the use of such processes frequently results in the loss of between 30 percent and 40 percent of the beam lead chips comprising an individual slice. This greatly increases the unit cost of the remaining chips. Second, such processes do not align the chips on the chip receiving member with sufficient accuracy to permit the subsequent use of automatic mechanisms to remove individual chips from the chip receiving member. Third, such processes do not provide adequate bonding between the chips and the chip receiving member to permit the use of the receiving member as a chip storage device.

The present invention relates to a cleaning and transferring process that does not result in the loss of beam lead chips and that positions the chip on a receiving member in an accurate and secure manner. In accordance with its broader aspects, the invention comprises a process in which a transfer member is secured to at least one semiconductor device while the device is mounted on a supporting member. Thereafter, the device is removed from the supporting member and is cleaned. After the cleaning step, the device is secured to a receiving member. Finally, the transfer member is released from the device.

In accordance with a more specific aspect of the invention, the transfer member is saturated with a solvent and is then secured to a plurality of beam lead chips. Subsequently, the chips are cleaned by immersing the transfer member and the chips in a bath comprising the same solvent. This prevents misalignment of the chips due to distortion of the transfer member upon contact with the bath.

In accordance with another specific aspect of the invention, the cleaning bath is heated and the transfer member is oriented vertically in the bath. This prevents misalignment of the chips due to differential heating between the chips and the transfer member.

In accordance with still another specific aspect of the invention, the transfer member is secured to the chips by an adhesive that is not attacked by the cleaning solvent. After the cleaning step, the chips are secured to a chip receiving member. Then, the transfer member, the chips and the receiving member are immersed in a solvent that does attack the adhesive. The latter solvent release the transfer member from the chips.

In accordance with yet another specific aspect of the invention, the chips are secured to a polyester chip receiving member. The receiving member is first rendered soft and sticky. Then, the chips are secured to the receiving member by the simultaneous application of heat and pressure.

A more complete understanding of the invention may be had by referring to the following detailed description when taken in conjunction with the drawings, wherein.

Figure 1:
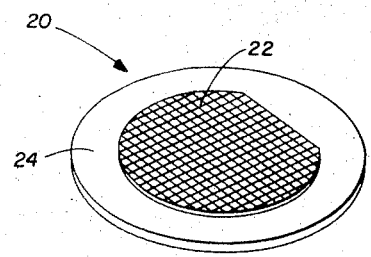
FIG. 1 is a perspective view showing a beam lead slice mounted on a sapphire disk.
Figure 2:
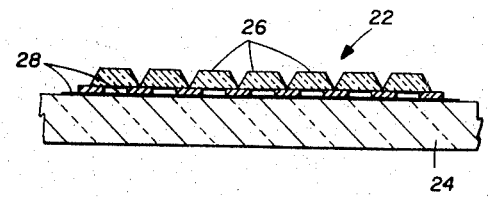
FIG. 2 is an enlarged sectional view of the slice and the disk in which the individual beam lead chips comprising the slice are shown.

Referring now to the drawings, a method of cleaning and transferring semiconductors employing the present invention is shown. Referring particularly to FIGS. 1 and 2, there is shown an assembly 20 comprising a beam lead slice or wafer 22 mounted on a sapphire disk 24. At the point in the processing of the slice 22 illustrated in FIGS. 1 and 2, the slice has been separated into a plurality of individual beam lead chips 26 all of which are secured to the disk 24 by a layer of wax 28 positioned between the slice and the disk.

Figure 3:
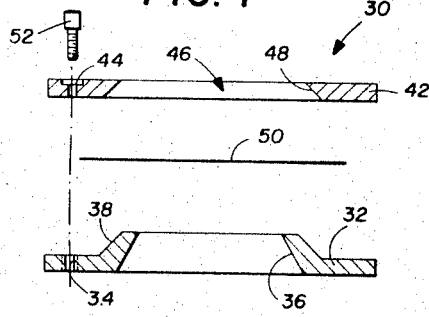
FIG. 3 is an exploded sectional view of a beam lead chip transfer member.

Referring now to FIG. 3, a beam lead chip transfer member 30 is shown. The member 30 includes a first ring 32 formed from aluminum or the like and having a plurality of tapped holes 34 formed through it. The ring 32 is provided with a central aperture 36 and with a male conical gripping surface 38.

The member 30 further includes a second ring 42. The ring 42 is formed from aluminum or the like, and has a plurality of screw receiving holes 44 formed through it. The ring 42 is provided with a central aperture 46 and with a female conical gripping surface 48 that extends at substantially the same angle as the surface 38 of the ring 32.

In the use of the member 30, a membrane 50, such as a layer of lint free filter paper or the like, is first thoroughly wetted with electronic grade trichlorethylene. Then, the membrane 50 is positioned over the aperture 36 in the ring 32. Thereafter, the ring 42 is positioned over the membrane 50 and is secured to the rings 32 by a plurality of screws 52 that extend through the holes 44 of the ring 42 and into threaded interengagement with the tapped holes 34 in the ring 32. As the screws 52 are tightened, the surfaces 38 and 48 on the rings 32 and 42, respectively, cooperate to draw the membrane 50 tightly across the aperture 36 of the ring 32 and to thereafter secure the membrane in a stretched condition.

At the beginning of the semiconductor cleaning and transferring process shown in the drawings, any dust, etc. that may be on the slice 22 is removed. Typically, this is accomplished by directing air pressurized to about 5 PSI toward the slice 22 through a ⅛-inch nozzle positioned about 10 inches from the slice. Thereafter, the transfer member 30 shown in FIG. 3 is secured to the beam lead chips 26 of the assembly 20 shown in FIGS. 1 and 2.

Figure 4:
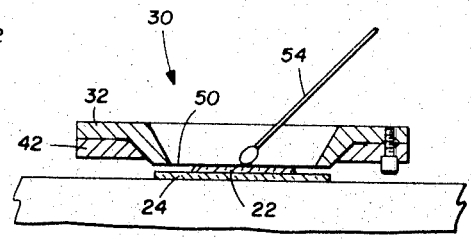
FIG. 4 is an illustration of a step in a method of cleaning and transferring semiconductors employing the present invention in which the transfer member is attached to the beam lead chips comprising the slice.

As is shown in FIG. 4, the transfer member 30 is attached to the chips 26 by mounting the assembly 20 on a flat surface and then positioning the membrane 50 of the member 30 in engagement with the chips 26. Thereafter, the membrane 50 is secured to the chips 26 by forcing a glue comprising one-fourth cellulose nitrate and three-fourths electronic grade acetone through the membrane into engagement with the chips. Preferably, this is accomplished by dipping a cotton swab 54 of the type used by doctors, housewives, etc. into the glue and simultaneously pressing the swab against and rolling the swab across the membrane 50. It has been found that the filling of all of the interstices between the chips 26 of the slice 22 can be assured by alternatively rolling the swab 54 across the membrane 50 in mutually perpendicular directions.

Figure 5:
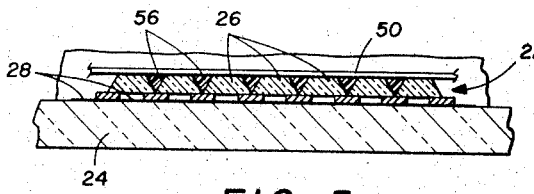
FIG. 5 is an enlarged sectional view showing the result of the step shown in FIG. 4.

When all of the interstices between the chips 26 have been filled with glue, the glue is allowed to set for about 15 minutes. At this point, the transfer member 30 and the assembly 20 are oriented as shown in FIG. 5. That is, the slice 22 is both secured to the sapphire disk 24 by a layer of wax 28 and is secured to the membrane of the transfer member 30 by a layer of glue 56. Because the layer of glue 56 fills all of the voids between the individual chips 26 of the slice 22, the slice can be disengaged from the sapphire disk 24 without disturbing the orientation of the individual chips comprising the slice.

Figure 6:
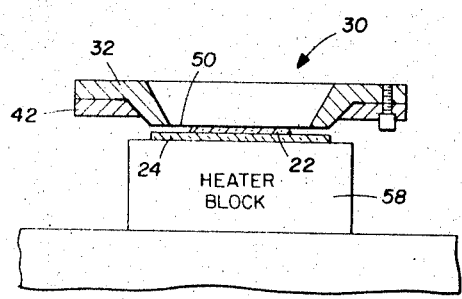
FIG. 6 is an illustration of a step in the method in which the beam lead chips are removed from the sapphire disk.

The chips are preferably removed from the sapphire disk 24 in the manner illustrated in FIG. 6. The disk 24 is positioned in engagement with a heater block 58 comprising a resistance heater mounted in a metal block. The resistance heater is operated to bring the temperature of the metal block to about 165°C. This temperature is sufficient to melt the layer of wax 28 between the sapphire disk 24 and the slice 22 but is not so high as to damage the chips 26 comprising the slice.

Preferably, the sapphire disk 24 is initially positioned in engagement with the block 58 for about 2 minutes. Then the disk 24 is removed from the block 58 and the edges of the slice 22 are carefully separated from the disk 24 by a knife edge. Next, the disk 24 is returned to the heater block 58. After a slight amount of reheating, the entire slice 22 is lifted from the disk 24.

Figure 7:
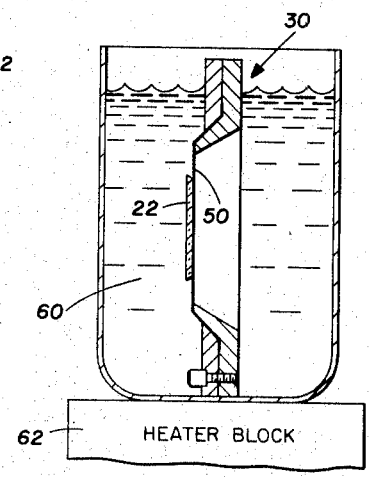
FIG. 7 is an illustration of a step in which the beam lead chips are cleaned.

After the slice 22 is removed from the disk 24, the chips 26 comprising the slice are cleaned. Preferably, this is accomplished in the manner shown in FIG. 7, wherein the assembly including the transfer member 30 and the slice 22 is shown positioned in a bath 60 comprising a solvent for the wax that initially secured the slice 22 to the disk 24. In accordance with the preferred embodiment, the bath 60 comprises a quantity of electronic grade trichlorethylene that is maintained at a temperature of between about 80°C and about 85°C by a heater block 62. In such a case, the assembly is retained in the bath 60 for about 4 minutes after which the slice 22 is dried for at least 5 minutes.

It will be noted that the membrane 50 was saturated with trichlorethylene before the assembly of the transfer member 30. This is very important because it eliminates distortion of the membrane 50 when the member 30 is immersed in the bath 60 and thereby prevents misalignment of the chips 26 due to such distortion. It will also be noted that the transfer member 30 is oriented vertically in the bath 60. This is also very important in that it causes the heat from the heater 62 to flow across the slice 22 rather than through the membrane 50. This reduces differential heating between the slice and the membrane and thereby eliminates misalignment of the chips 26 due to such differential heating.

Figure 8:
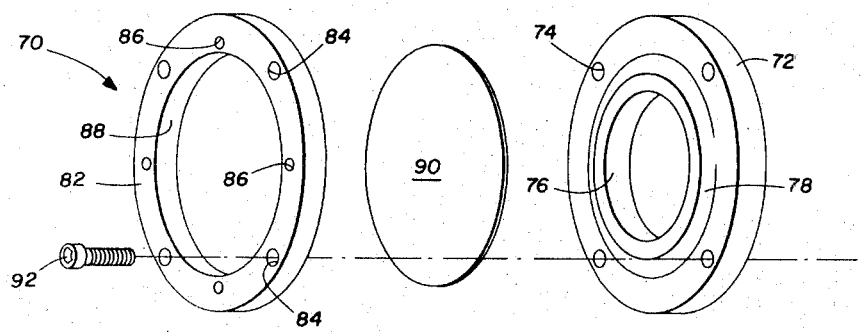
FIG. 8 is an exploded perspective view of a beam lead chip receiving member.

Referring now to FIG. 8, a beam lead chip receiving member 70 is shown. The member 70 comprises a first ring 72 which is similar to the first ring 32 of the transfer member 30 in that it is formed from aluminum or the like and has a plurality of tapped holes 74 formed through it. The ring 72 is provided with a central aperture 76 and with a male conical gripping surface 78.

The member 70 further includes a second ring 82. The ring 82 is similar to the second ring 42 of the member 30 in that it is formed from aluminum or the like and has a plurality of screw receiving holes 84 formed through it. The second ring 82 differs frrom the ring 42 in that it is provided with a plurality of screw head receiving indentations 86. The ring 82 has a female conical gripping surface 88 that extends at substantially the same angle as the surface 78 of the ring 72.

In the use of the chip receiving member 70, a membrane 90 is positioned over the aperture 76 formed in the first ring 72. Thereafter, the second ring 82 is positioned over the membrane 90 and is secured to the first ring 72 by a plurality of screws 92 that extend through the holes 84 of the ring 82 into threaded interengagement with the tapped holes 74 in the ring 72. During the tightening of the screws 92, the surfaces 78 and 88 on the rings 72 and 82, respectively, cooperate to draw the membrane 90 tightly across the aperture 76 of the ring 72 and to thereafter secure the membrane 90 in a stretched condition.

In accordance with the preferred embodiment of the invention, the membrane 90 comprises a polyester film, such as polyethylene terephthalate ("MYLAR"). For example, the membrane 90 may be formed from a polyester base, black line, matte surface blueprint paper of the type sold by the Frederick Post Company, Chicago, Ill. under the trademark "DIAZOTYPE" and particularly, the paper identified by that company as Tuftex 208-PEL. Such paper has a 0.003 inch thick polyethylene terphthalate base and a photosensitive surface suitable for development in an ammonia type blueprint machine. When this material is used in the present process, the photosensitive layer is first removed by passing the material through the light exposure portion of such a blueprint machine. This renders the photosensitive surface of the paper transparent by removing silver bromide therefrom and thus eliminates any possibility of chip contamination from the silver bromide. Thereafter, the remaining polyester layer is positioned in the beam lead chip receiving member 70 with its dull surface facing the second ring 82.

Figure 9:
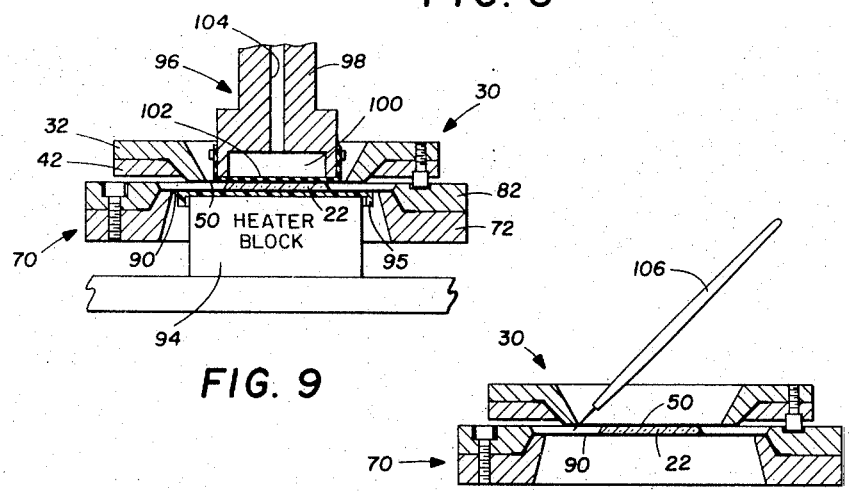
FIG. 9 is an illustration of a step in the method of cleaning and transferring semiconductors in which the beam lead chips are attached to the chip receiving member.

The next step in the method of cleaning and transferring beam lead chips shown in the drawings comprises attaching the slice 22 to the membrane 90 of the chip receiving member 70. As is best shown in FIG. 9, this is preferably accomplished by mounting the chip receiving member 70 on a heater block 94 comprising a metal block, a resistance heater and a caap 95 formed from tetrafluoroethylene. Then, both the dull surface of the membrane 90 and the surface of the membrane 50 facing away from the slice 22 are thoroughly wetted with electronic grade trichlorethylene.

At this point, the slice 22 is positioned in engagement with a dull surface of the membrane 90. During this positioning of the transfer member 30, the heads of the screws 52 enter the indentations 86 of the ring 82 to assure proper alignment of the slice 22 and the receiving member 70. Then, the chips 26 comprising the slice 22 are attached to the membrane 90 of the member 70 by the immediate application of both heat and pressure.

The heat necessary for the chip attaching step is supplied by the heater block 94 which is operated to heat the chips 26 to between about 150°C and about 200°C depending on the type and size of the chips. The pressure is supplied by a plunger 96 comprising a ram 98 having a cavity 100 formed in its distal end and a rubber membrane 102 mounted across the open end of the cavity 100. A passageway 104 extends to the cavity 100 for use in pressuring the membrane 102 with compressed air. In the use of the plunger 96, the force on the ram 98 and the pressure within the cavity 100 are regulated to provide a net force on the chips 26 of between 3 and 30 PSI again depending on the type and size of the chips.

Figure 10:
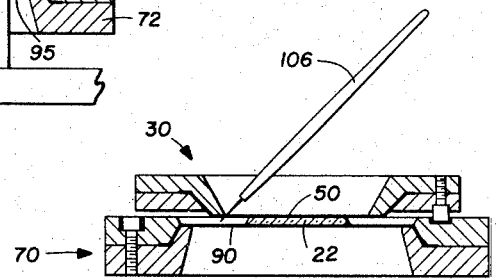
FIG. 10 is an illustration of a step in the method in which a portion of the transfer member is severed from another portion.
Figure 11:
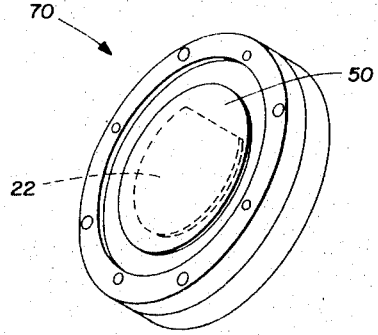
FIG. 11 is a perspective view showing the result of the step shown in FIG. 10.

The heat and pressure of the chip attaching step shown in FIG. 9 are maintained for between about 3 minutes and about 6 minutes depending on chip type and size. Then, the assembly comprising the transfer member 30, the slice 22 and the receiving member 70 is removed from the heater block 94 and the membrane 50 is severed from the rings 32 and 42 comprising the transfer member 30. This is preferably accomplished in the manner shown in FIG. 10, that is, by employing a knife 106 to sever the portion of the membrane 50 secured between the rings 32 and 42 from the portion attached to the slice 22. The result of this step is illustrated in FIG. 11, wherein the slice 22 is shown mounted on the receiving member 70 and covered by a portion of the membrane 50.

Figure 12:
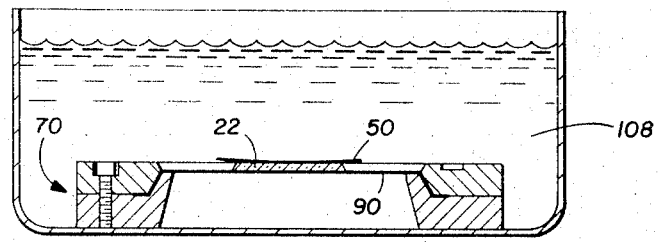
FIG. 12 is an illustration of a step in the method showing the removal of the portion of the transfer member from the beam lead chips of the slice.

The next step in the method of cleaning and transferring semiconductors comprises disengaging the portion of the membrane 50 from the slice 22. As is best shown in FIG. 12, this is preferably accomplished by immersing the receiving member 70 in a bath 108 comprising a solvent for the glue that was employed in the initial stages of the process to secure the slice 22 to the membrane 50. The position of the receiving member 70 in the bath 108 is important because if the member 70 is not oriented horizontally in the bath 108, the chips 26 comprising the slice 22 may become misaligned during the softening of the glue due to the action of gravity.

In accordance with the preferred embodiment, the bath 108 comprises electronic grade acetone and the member 70 is immersed in the bath for between about 10 minutes and about 20 minutes depending on the surface conditions of the chips. Ordinarily, this is sufficient to cause the portion of the membrane 50 to float away from the slice 22. If necessary, however, the portion of the membrane 50 can be pulled away from the slice 22 with tweezers. After the portion of the membrane is removed the assembly comprising the slice 22 and the receiving member 70 is allowed to dry for about 10 minutes.

Figure 13:
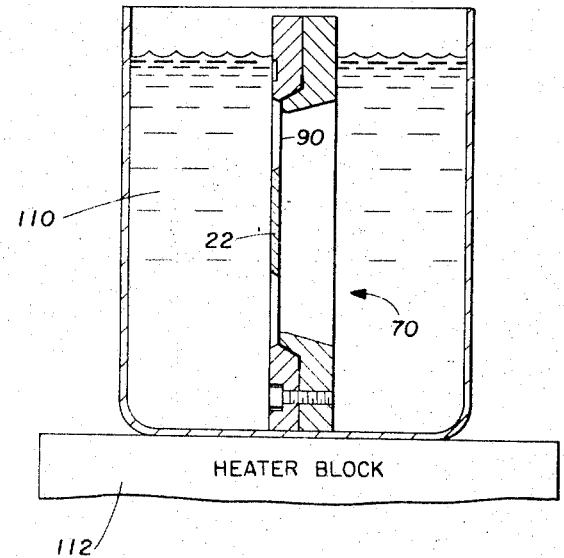
FIG. 13 is an illustration of a step in the method in which the beam lead chips are cleaned.

At the end of the removal step, the transfer of the beam lead chips is complete. All that remains to be accomplished in the process is the cleaning of the remaining glue or other impurities from the chips. Preferably, this is accomplished in the manner shown in FIG. 13, wherein the member 70 is shown immersed in a bath 110.

The bath 110 may comprise any suitable glue solvent. Preferably, however, the bath comprises research grade xylene which is maintained at a temperature of about 80°C by a heater 112. Alternatively, the bath 110 may comprise boiling electronic grade trichloroethylene. Again, the vertical orientation of the slice 22 in the bath 110 is important because it reduces differential heating between the membrane 90 and the slice 22 and thereby prevents misalignment of the chips 26 during the cleaning step. The member 70 is preferably maintained in the bath 110 for about 10 minutes and is thereafter allowed to dry and to cool to room temperature.

Figure 14:
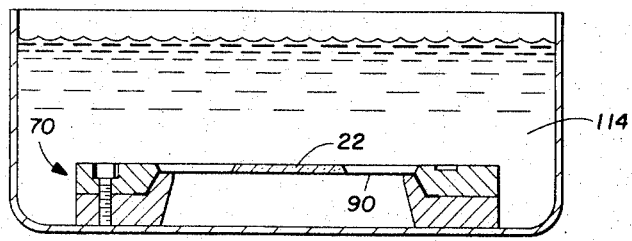
FIG. 14 is an illustration of another cleaning step.

After the cleaning step, it is necessary to remove the solvent comprising the bath 110 from the chips comprising the slice 22. This is preferably accomplished in the manner shown in FIG. 14, wherein the member 70 is shown immersed in a bath 114 comprising a material that is both a solvent for the material of the bath 110 and that does not leave a residue on the chips 26. In accordance with the preferred embodiment, the bath 114 is comprised of electronic grade acetone and the member 70 is permitted to remain in the bath for up to about 15 minutes.

Figure 15:
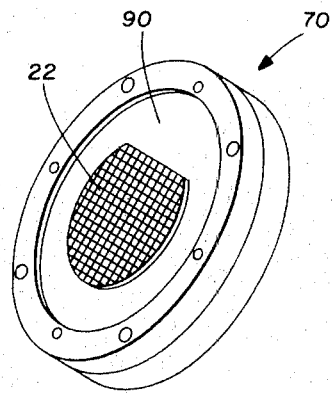
FIG. 15 is an illustration of the end result of the method.

At this point, the method of cleaning and transferring semiconductors according to the present invention is complete. That is, the chips 26 comprising the slice 22 have been completely cleaned and have been transferred from the sapphire disk 24 to the chip receiving member 70. By comparing FIG. 15 with FIG. 1, it will be noted that at the conclusion of the process, the chips 26 of the slice 22 are oriented in the same manner as they were at the start of the process.

In certain instances, it may be desirable to attach the receiving member 70 to the side of the chips 26 opposite the side that is initially attached to the sapphire disk 24. In such a case, the disk 24 is positioned on the heater block 94 shown in FIG. 9 and the receiving member 70 is assembled in the manner shown in FIG. 8. Then, the dull surface of the membrane 90 is positioned in engagement with the chips 26, and the heater block 94 and the plunger 96 are operated to simultaneously apply heat and pressure to the point of engagement between the membrane and the chips. This both attaches the chips 26 to the receiving member 70 and releases the chips from the disk 24. Subsequently, any remaining wax is removed from the chips by immersing the receiving member and the chips in the bath 60.

It will be understood that the substances identified herein in conjunction with the preferred embodiment are not critical to the practice of the invention. For example, it is necessary that the glue used in the step shown in FIG. 4 be both insoluble in the wax solvent used in the step shown in FIG. 7 and soluble in the solvent used in the step shown in FIG. 12. However, within these parameters, the compositions of the glue and the solvents is immaterial and may be varied to suit particular needs.

Likewise, the nature of the transfer member is not critical to the practice of the invention. That is, the membrane of the transfer member can be comprised of any substance that remains dimensionally stable throughout the cleaning and transferring process. Furthermore, the membrane can be supported in any suitable manner and need not be supported in the mechanism shown.

The nature of the receiving member and the method of attaching the chips to the receiving member can also be altered in accordance with the particular requirements. For example, various conventional processes can be employed to mount the chips on various polymeric materials, if desired. Alternatively, the chips may be secured to a resin coated glass plate by simply pressing the chips into engagement with the resin.

The use of the present invention in the cleaning and transferring of semiconductors results in several advantages over the prior art. For example, the use of the invention permits the transfer of a semiconductor slice from a supporting member to a receiving member without loss of the chips comprising the slice. Thus, the problem of losing a large percentage of the chips comprising each slice that has characterized most prior cleaning and transferring processes is completely eliminated.

Another very important advantage from the use of the present invention comprises the highly accurate positioning of the chips on the receiving member. In actual practice, chips have been mounted on receiving members within a tolerance of ±0.001 inch and ±1°. This permits the subsequent removal of individual chips from the receiving member by automatic mechanisms.

Still another advantage resulting from the use of the present invention involves the bond that is obtained between the chips and the receiving member. Most prior semiconductor cleaning and transferring processes have not formed a chip receiving member bond of sufficient strength to permit the use of the receiving member as a chip storage device. The present invention, on the other hand, secures chips to receiving members in such a way that the receiving member can be used for long term chip storage.

Although specific embodiment of the invention is shown in the drawings and described herein, it will be understood that the invention is not limited to the embodiment disclosed but is capable of rearrangement, modification and substitution of parts and elements without departing from the spirit of the invention.

What is claimed is:

1. A method of cleaning and transferring semiconductors comprising:
   a. gluing a wax-solvent wetted transfer membrane to the exposed surfaces of a plurality of semiconductor chips secured by wax to a supporting member;
   b. heating said supporting member to a temperature sufficient to soften said wax and release said chips from said supporting member;
   c. immersing said transfer membrane and said chips glued thereto in a bath of said wax-solvent for a period of time sufficient to remove any wax residue from said chips;
   d. thereafter removing said transfer membrane and said attached chips from said wax-solvent and securing a receiving membrane to the exposed surfaces of said chips;
   e. immersing said chips and said membranes attached thereto in a bath of glue-solvent for a period of time sufficent to release said transfer membrane from said chips;
   f. thereafter cleaning said chips and attached receiving membrane in a fluid solvent for said glue.

2. The method of claim 1, wherein said transfer membrane is lint-free filter paper and said receiving membrane is polyethylene terephthalate.

3. The method of claim 2 wherein said glue comprises cellulose nitrate thinned with acetone, said wax-solvent comprises trichloroethylene and said fluid solvent comprises xylene.

4. The method of claim 3 wherein said chips are further cleaned by immersion in a bath of acetone.

5. A method of cleaning and transferring semiconductors comprising:
   a. gluing to the exposed surfaces of a plurality of semiconductor chips secured by wax to a supporting member a transfer membrane of lint-free filter paper wetted with trichloroethylene and stretched across a frame member by the application of acetone thinned cellulose nitrate through said transfer membrane onto and around said semiconductor chips;
   b. heating the assembly thus formed to soften said wax sufficiently to release said semiconductor chips from said supporting member;
   c. immersing said frame member, said transfer membrane and said chips glued thereto in a bath of trichloroethylene for a time sufficient to remove wax residue from said chips;
   d. thereafter adhering to the exposed faces of said chips a receiving membrane of polyethylene terephthalate wetted with trichloroethylene and stretched across a frame member by the application of heat to said receiving membrane while said receiving membrane is held in pressure contact with said chips;

e. removing at least that portion of said transfer membrane glued to said chips from said transfer frame member;

f. immersing said chips and said membranes adhering thereto in a bath of acetone for a time sufficient to release said portion of said transfer membrane from said chips; and g. thereafter cleaning said chips by immersing said chips, said receiving membrane and said receiving frame member in a bath of xylene.

6. The method of claim 5 wherein said baths of trichloroethylene and of xylene are maintained at a temperature of about 80° to 85°C.

7. The method of claim 5 wherein said heat and pressure applied to said receiving membrane are in the range of from 150° to 200° C and from 3 to 30 psi.

8. The method of claim 5 wherein said transfer membrane is maintained in an essentially vertical plane in said trichloroethylene bath and said receiving membrane is maintained in an essentially horizontal plane in said acetone both and in an essentially vertical plane in said xylene bath.

* * * * *